US010366292B2

(12) United States Patent
Min et al.

(10) Patent No.: US 10,366,292 B2
(45) Date of Patent: *Jul. 30, 2019

(54) TRANSLATING VIDEO TO LANGUAGE USING ADAPTIVE SPATIOTEMPORAL CONVOLUTION FEATURE REPRESENTATION WITH DYNAMIC ABSTRACTION

(71) Applicant: NEC Laboratories America, Inc., Princeton, NJ (US)

(72) Inventors: Renqiang Min, Princeton, NJ (US); Yunchen Pu, Durham, NC (US)

(73) Assignee: NEC Corporation (JP)

( * ) Notice: Subject to any disclaimer, the term of this patent is extended or adjusted under 35 U.S.C. 154(b) by 69 days.

This patent is subject to a terminal disclaimer.

(21) Appl. No.: 15/794,758

(22) Filed: Oct. 26, 2017

(65) Prior Publication Data
US 2018/0121734 A1 May 3, 2018

Related U.S. Application Data

(60) Provisional application No. 62/416,878, filed on Nov. 3, 2016.

(51) Int. Cl.
*G06K 9/00* (2006.01)
*G06K 9/46* (2006.01)
(Continued)

(52) U.S. Cl.
CPC ..... *G06K 9/00751* (2013.01); *G06K 9/00718* (2013.01); *G06K 9/00758* (2013.01);
(Continued)

(58) Field of Classification Search
None
See application file for complete search history.

(56) References Cited

U.S. PATENT DOCUMENTS 9,807,473 B2* 10/2017 Mei .................... H04N 21/8405
2017/0124432 A1* 5/2017 Chen .................... G06N 3/0454
(Continued)

OTHER PUBLICATIONS

Tran, D., Bourdev, L., Fergus, R., Torresani, L., & Paluri, M. (2015). Learning spatiotemporal features with 3d convolutional networks. In Proceedings of the IEEE Inter (Year: 2015).*
(Continued)

*Primary Examiner* — Andrae S Allison
(74) *Attorney, Agent, or Firm* — Joseph Kolodka (57) ABSTRACT

A system is provided for video captioning. The system includes a processor. The processor is configured to apply a three-dimensional Convolutional Neural Network (C3D) to image frames of a video sequence to obtain, for the video sequence, (i) intermediate feature representations across L convolutional layers and (ii) top-layer features. The processor is further configured to produce a first word of an output caption for the video sequence by applying the top-layer features to a Long Short Term Memory (LSTM). The processor is further configured to produce subsequent words of the output caption by (i) dynamically performing spatiotemporal attention and layer attention using the intermediate feature representations to form a context vector, and (ii) applying the LSTM to the context vector, a previous word of the output caption, and a hidden state of the LSTM. The system further includes a display device for displaying the output caption to a user.

18 Claims, 10 Drawing Sheets

(51) Int. Cl.
- G06N 3/04 (2006.01)
- G06K 9/66 (2006.01)
- H04N 5/278 (2006.01)
- G06K 9/62 (2006.01)
- H04N 21/218 (2011.01)
- H04N 21/234 (2011.01)
- H04N 21/488 (2011.01)
- G06K 9/72 (2006.01)
- H04N 7/18 (2006.01)

(52) U.S. Cl.
CPC ..... *G06K 9/00771* (2013.01); *G06K 9/00973* (2013.01); *G06K 9/4628* (2013.01); *G06K 9/6257* (2013.01); *G06K 9/6277* (2013.01); *G06K 9/66* (2013.01); *G06K 9/726* (2013.01); *G06N 3/0445* (2013.01); *G06N 3/0454* (2013.01); *H04N 5/278* (2013.01); *H04N 7/181* (2013.01); *H04N 7/183* (2013.01); *H04N 21/2181* (2013.01); *H04N 21/23418* (2013.01); *H04N 21/4884* (2013.01); *G06K 2009/00738* (2013.01)

(56) References Cited

U.S. PATENT DOCUMENTS

| | | | | |
|---|---|---|---|---|
| 2017/0127016 A1* | 5/2017 | Yu | ................... | G06K 9/00711 |
| 2017/0150235 A1* | 5/2017 | Mei | ................. | H04N 21/8405 |
| 2018/0075343 A1* | 3/2018 | van den Oord | ..... | G06F 17/2818 |
| 2018/0137389 A1* | 5/2018 | Mathieu | ............. | G06K 9/00718 |
| 2018/0144248 A1* | 5/2018 | Lu | ......................... | G06F 17/241 |
| 2018/0189572 A1* | 7/2018 | Hori | ....................... | G06F 17/28 |

OTHER PUBLICATIONS

Bell, Sean, et al. "Inside-outside net: Detecting objects in context with skip pooling and recurrent neural networks." Proceedings of the IEEE conference on computer vision and pattern recognition. Dec. 14, 2015. (Year: 2015).*

Xu, Kelvin, et al. "Show, attend and tell: Neural image caption generation with visual attention." International conference on machine learning. 2015. (Year: 2015).*

Ballas et al., "Delving Deeper into Convolutional Networks for Learning Video Representation", ARXIV, Nov. 2015, 2 pages.

Pan et al., "Hierarchical Recurrent Neural Encoder for Video Representation with Application to Captioning", CVPR, Jun. 2016, pp. 1030-1038.

Pu et al., "Adaptive Feature Abstraction for Translating Video to Text", AAAI, Feb. 2018, 8 pages.

Pu et al., "Adaptive Feature Abstraction for Translating Video to Language", Published as a workshop paper at ICLR 2017, Oct. 2017, pp. 1-13.

Yu et al., "Video Paragraph Captioning Using Hierarchical Recurrent Neural Networks", CVPR Jun. 2016, pp. 4584-4593.

* cited by examiner

TRANSLATING VIDEO TO LANGUAGE USING ADAPTIVE SPATIOTEMPORAL CONVOLUTION FEATURE REPRESENTATION WITH DYNAMIC ABSTRACTION

RELATED APPLICATION INFORMATION

This application claims priority to provisional application Ser. No. 62/416,878 filed on Nov. 3, 2016, incorporated herein by reference. This application is related to an application entitled "Video Retrieval System Using Adaptive Spatiotemporal Convolution Feature Representation With Dynamic Abstraction For Video To Language Translation", Ser. No. 15/794,802, and which is incorporated by reference herein in its entirety. This application is related to an application entitled "Surveillance System Using Adaptive Spatiotemporal Convolution Feature Representation With Dynamic Abstraction For Video To Language Translation", Ser. No. 15/794,840, and which is incorporated by reference herein in its entirety.

BACKGROUND

Technical Field

The present invention relates to video processing, and more particularly to translating video to language using an adaptive spatiotemporal convolution feature representation with dynamic abstraction.

Description of the Related Art

Videos represent among the most widely used forms of data, and their accurate characterization poses an important challenge for computer vision, machine learning, and other related technologies. Generating a natural-language description of a video, termed video captioning, is an important component of video analysis that has many applications such as video indexing, video retrieval, video surveillance, human computer interaction, and automatic driving assistance.

Thus, there is a need for an improved approach for video captioning.

SUMMARY

According to an aspect of the present invention, a system is provided for video captioning. The system includes a processor. The processor is configured to apply a three-dimensional Convolutional Neural Network (C3D) to image frames of a video sequence to obtain, for the video sequence, (i) intermediate feature representations across L convolutional layers and (ii) top-layer features. The processor is further configured to produce a first word of an output caption for the video sequence by applying the top-layer features to a Long Short Term Memory (LSTM). The processor is further configured to produce subsequent words of the output caption by (i) dynamically performing spatiotemporal attention and layer attention using the intermediate feature representations to form a context vector, and (ii) applying the LSTM to the context vector, a previous word of the output caption, and a hidden state of the LSTM. The system further includes a display device for displaying the output caption to a user.

According to another aspect of the present invention, a computer-implemented method is provided for video captioning. The method includes applying, by a processor, a three-dimensional Convolutional Neural Network (C3D) to image frames of a video sequence to obtain, for the video sequence, (i) intermediate feature representations across L convolutional layers and (ii) top-layer features. The method further includes producing, by the processor, a first word of an output caption for the video sequence by applying the top-layer features to a Long Short Term Memory (LSTM). The method also includes producing, by the processor, subsequent words of the output caption by (i) dynamically performing spatiotemporal attention and layer attention using the intermediate feature representations to form a context vector, and (ii) applying the LSTM to the context vector, a previous word of the output caption, and a hidden state of the LSTM. The method additionally includes displaying, by a display device, the output caption to a user.

According to yet another aspect of the present invention, a computer program product is provided for video captioning. The computer program product includes a non-transitory computer readable storage medium having program instructions embodied therewith. The program instructions are executable by a computer to cause the computer to perform a method. The method includes applying, by a processor of the computer, a three-dimensional Convolutional Neural Network (C3D) to image frames of a video sequence to obtain, for the video sequence, (i) intermediate feature representations across L convolutional layers and (ii) top-layer features. The method further includes producing, by the processor, a first word of an output caption for the video sequence by applying the top-layer features to a Long Short Term Memory (LSTM). The method also includes producing, by the processor, subsequent words of the output caption by (i) dynamically performing spatiotemporal attention and layer attention using the intermediate feature representations to form a context vector, and (ii) applying the LSTM to the context vector, a previous word of the output caption, and a hidden state of the LSTM. The method additionally includes displaying, by a display device operatively coupled to the computer, the output caption to a user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to translating video to language using an adaptive spatiotemporal convolution feature representation with dynamic abstraction.

In an embodiment, the present invention proposes an approach for generating a sequence of words dynamically emphasizes different levels (CNN layers) of 3D convolutional features, to model important coarse or fine-grained spatiotemporal structures. Additionally, the model adaptively attends to different locations within the feature maps at particular layers. In an embodiment, the model adopts features from a deep 3D convolutional neural network (C3D). Such features have been shown to be effective for video representations, action recognition and scene understanding, by learning the spatiotemporal features that can provide better appearance and motion information. In addition, in an embodiment, the functionality of an adaptive spatiotemporal feature representation with dynamic abstraction in our model is implemented by two interpretable attention mechanisms, involving comparing and evaluating different levels of 3D convolutional feature maps. A challenge with this approach is that the features from different C3D levels have distinct dimensions. For example, low-level features provide fine resolution on localized spatiotemporal regions, while high-level features capture extended spatiotemporal space with less resolution. To enable direct comparisons between layers, we employ convolution operations to map different levels of features to the same semantic-space dimension, to enhance the decoding process.

It is to be appreciated that the translation of video to language, that is, video captioning, in accordance with the present invention can be applied to applications including, but not limited to, any of the following: video retrieval; surveillance; and so forth. Of course, the present invention can also be applied to a myriad of other applications, as readily appreciated by one of ordinary skill in the art given the teachings of the present invention provided herein, while maintaining the spirit of the present invention.

Hereinafter, various systems 100-300 are described with respect to FIGS. 1-3, respectively. While a camera system is shown with respect to these systems, in other embodiments, the system can be modified to simply receive already captured video such that the capturing elements are omitted. These and other variations of systems 100-300 are readily determined by one of ordinary skill in the art given the teachings of the present invention provided herein, while maintaining the spirit of the present invention.

Figure 1:
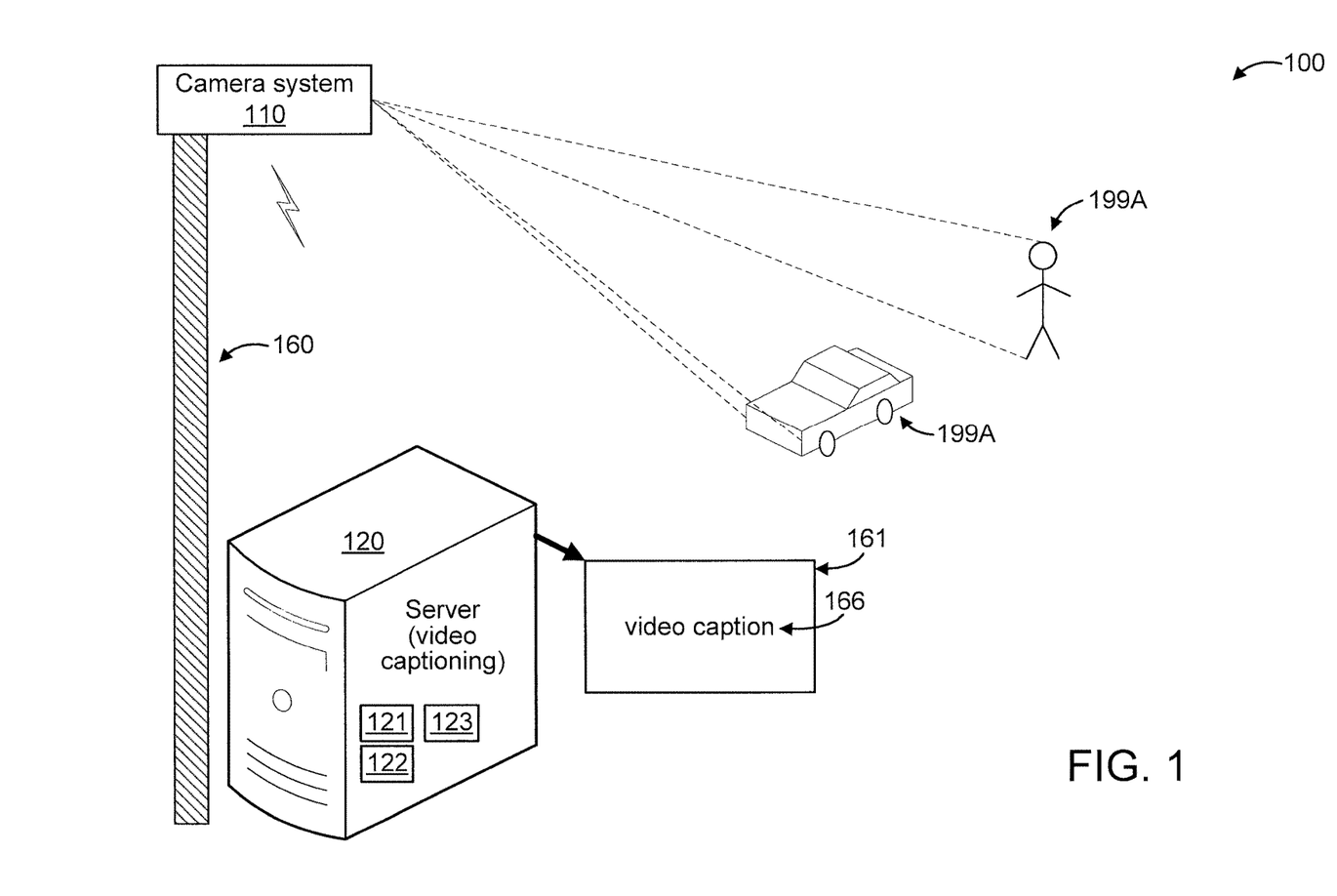
FIG. 1 shows an exemplary system for translating video to language, in accordance with an embodiment of the present invention.

FIG. 1 shows an exemplary system 100 for translating video to language, in accordance with an embodiment of the present invention. In an embodiment, the system 100 can use adaptive spatiotemporal convolution feature representation with dynamic abstraction to translate the video to language. In an embodiment, the translated language serves as a "caption" for the video. Given that system 100 involves video to language translation, system 100 can also be interchangeably referred to herein as a "video captioning system". Moreover, system 100 can be configured to perform more functions based on the determined captions, as explained in further detail herein below.

The system 100 includes a camera system 110. While a single camera system 110 is shown in FIG. 1 for the sakes of illustration and brevity, it is to be appreciated that multiple camera systems can be also used, while maintaining the spirit of the present invention. The camera system 110 is configured to captures a video sequence formed from a set of input video frames that can include one or more objects 199A In the embodiment of FIG. 1, the camera system 110 is mounted on a mounting entity 160. For the sake of illustration, the mounting entity 160 is a pole. While a pole 160 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 110 can be mounted in or on any of the following: a building; a drone; a vehicle; and so forth. The preceding examples are merely illustrative.

The camera system 110 can be a wireless camera system having its own antenna(s) or can use one or more antennas included on the pole 160 (or other mounting entity (e.g., building, drone, vehicle, etc.) to which the camera system 110 is mounted or proximate).

The system 100 further includes a server 120 configured to perform video to language translation. The video to language translation can involve performing one or more response actions (e.g., in response to the resultant text translation). The server 120 can located remote from, or proximate to, the camera system 110. The server 120 can be include, e.g., a processor 121, a memory 122, and a wireless transceiver 123. The processor 121 and the memory 122 of the server 120 can be configured to perform video to language translation based on video received from the camera system 110 by the (the wireless transceiver 123 of) the server 120. In this way, text (e.g., a video caption) 166 translated from the video can be provided (e.g., on a display device 161 coupled to the server 120) for any of a myriad of possible applications relating to video processing. Such applications can involve one or more actions performed responsive to the text, as readily appreciated by one of ordinary skill in the art. Such applications can include, but are not limited to, video captioning, video retrieval, video indexing, video analysis, action (occurring in the video) analysis, computer vision, surveillance, and so forth. It is to be appreciated that the preceding applications are merely illustrative and, thus, other applications can also be used, while maintaining the spirit of the present invention.

Figure 2:
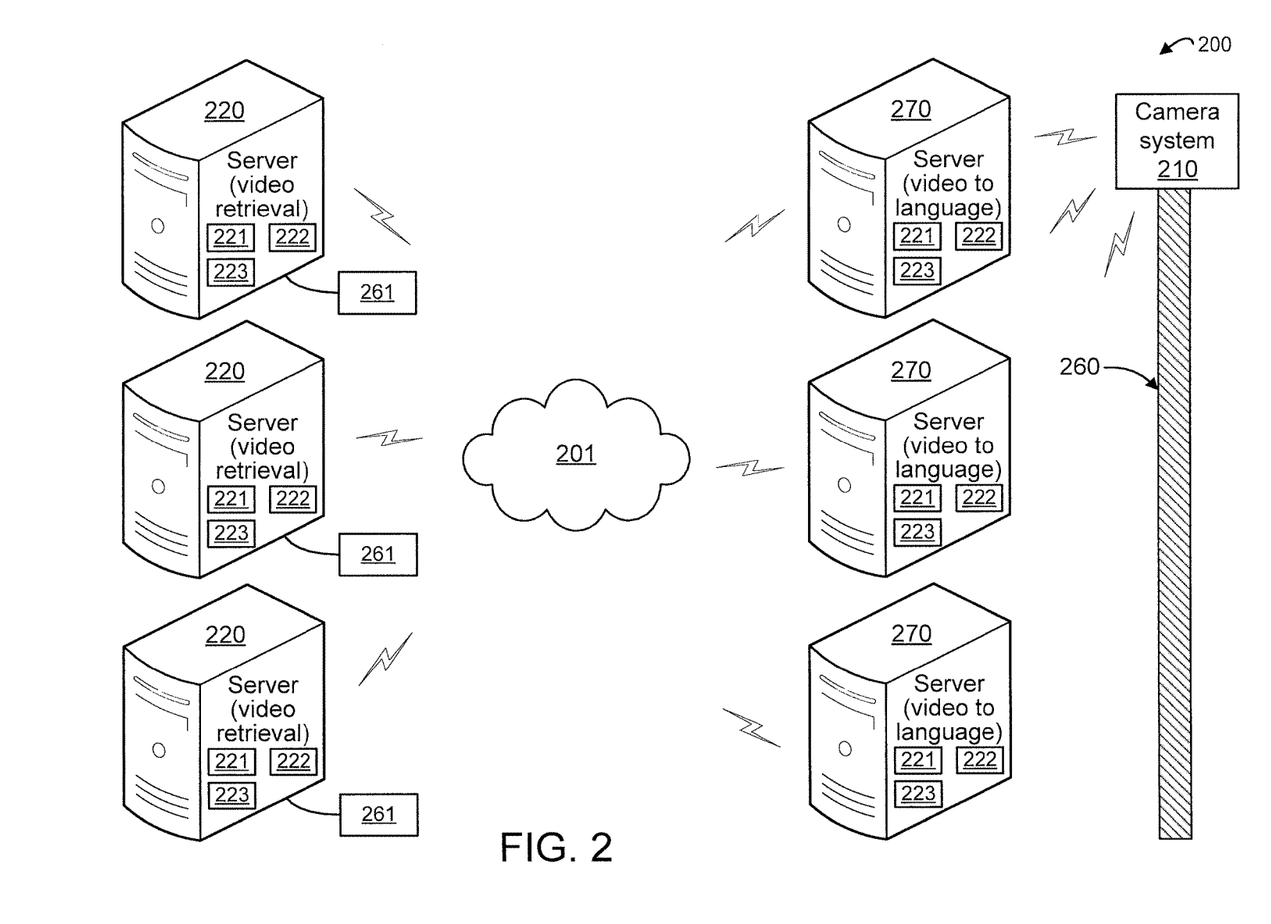
FIG. 2 shows an exemplary system for video retrieval, in accordance with an embodiment of the present invention.

FIG. 2 shows an exemplary system 200 for video retrieval, in accordance with an embodiment of the present invention. In an embodiment, the system 200 can use adaptive spatiotemporal convolution feature representation with dynamic abstraction to translate video to language for the video retrieval.

The system 200 includes a camera system 210. While a single camera system 210 is shown in FIG. 2 for the sakes of illustration and brevity, it is to be appreciated that multiple camera systems can be also used, while maintaining the spirit of the present invention. The camera system 210 is configured to captures a video sequence formed from a set of input video frames that can include one or more objects.

In the embodiment of FIG. 2, the camera system 210 is mounted on a mounting entity 260. For the sake of illustration, the mounting entity 260 is a pole. While a pole 260 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 210 can be mounted in or on any of the following: a building; and so forth. The preceding examples are merely illustrative.

The camera system 210 can be a wireless camera system having its own antenna(s) or can use one or more antennas included on the pole 260 (or other mounting entity (e.g., building, drone, etc.) to which the camera system 210 is mounted or proximate).

The system 200 further includes a set of servers (with each member of the set designated by the figure reference numeral 220) and a set of servers (with each memory of the set designated by the figure reference numeral 270) interconnected by one or more networks (collectively denoted by the figure reference numeral 201). The servers 220 are configured to perform video retrieval. Such video retrieval can be with respect to a (video) database implemented across the set of servers 270, which can be configured to store videos (where the set includes one or more members, with the example of FIG. 2 showing 3 members). The set of servers 220 and the set of servers 270 can include any number of members, depending upon the implementation.

In an embodiment, the servers 270 are configured to perform video to language translation in accordance with the present invention. The servers 220 can send text that describes topics of interest to users thereof, where such topics can be implicated in one or more of the videos stored on one or more of servers 270. In an embodiment, one of the servers 270 can then manage a local search across itself and the other servers in the set 270 (or across simply one server (e.g., itself or another server) or a subset, depending upon the implementation) in order to search for and retrieve relevant videos to the text to send to server 220. The text resident on the servers 270 and used for matching purposes against the text sent from any of the servers 220 is obtained by performing video to language translation in accordance with the present invention. In this way, videos resident on the servers can be translated thereby into a textual representation for indexing, searching, retrieval, analysis, and so forth, as readily appreciated by one of ordinary skill in the art, given the teachings of the present invention provided herein. Moreover, in the case of multiple servers 220 providing text, in an embodiment, the servers 270 can be managed to store descriptions in all of the servers 270 in the set, but only store the corresponding videos in ones of the servers 270 closest to commonly requesting ones of the servers 220 to shorten transmission time and well as overall storage requirements. For example, in an embodiment, data can be moved between the servers 270 in order to place certain videos closest to the servers 220 that often (or are expected to) request those videos.

Text (e.g., a video caption) 266 translated from the video can be provided, e.g., on a display device 261 coupled to the server 220 or another device (e.g., an electronic lock, etc.).

The server 220 can be located remote from, or proximate to, the camera system 210. Each of the servers 220 and 270 can include a processor 221, a memory 222, and a wireless transceiver 223. The servers 220 can further include a display device 261 for displaying videos and text (e.g., captions), the text being translated from the videos. In the case of the servers 270, the memory 222 can be configured to implement a database. In an embodiment, the database is a distributed database implemented across all or a subset (having more than one member) of the servers 270. In another embodiment, one of the servers 270 can implement the database in its memory 222. These and other variations of system 200 are readily contemplated by one of ordinary skill in the art, given the teachings of the present invention provided herein, while maintaining the spirit of the present invention.

Accordingly, some exemplary suitable applications to which the present invention can be applied can include any applications where video retrieval can prove useful such as in video media purchasing, video media renting, shopping, analysis, and so forth. It is to be appreciated that the preceding applications are merely illustrative and, thus, other applications can also be used, while maintaining the spirit of the present invention.

Figure 3:
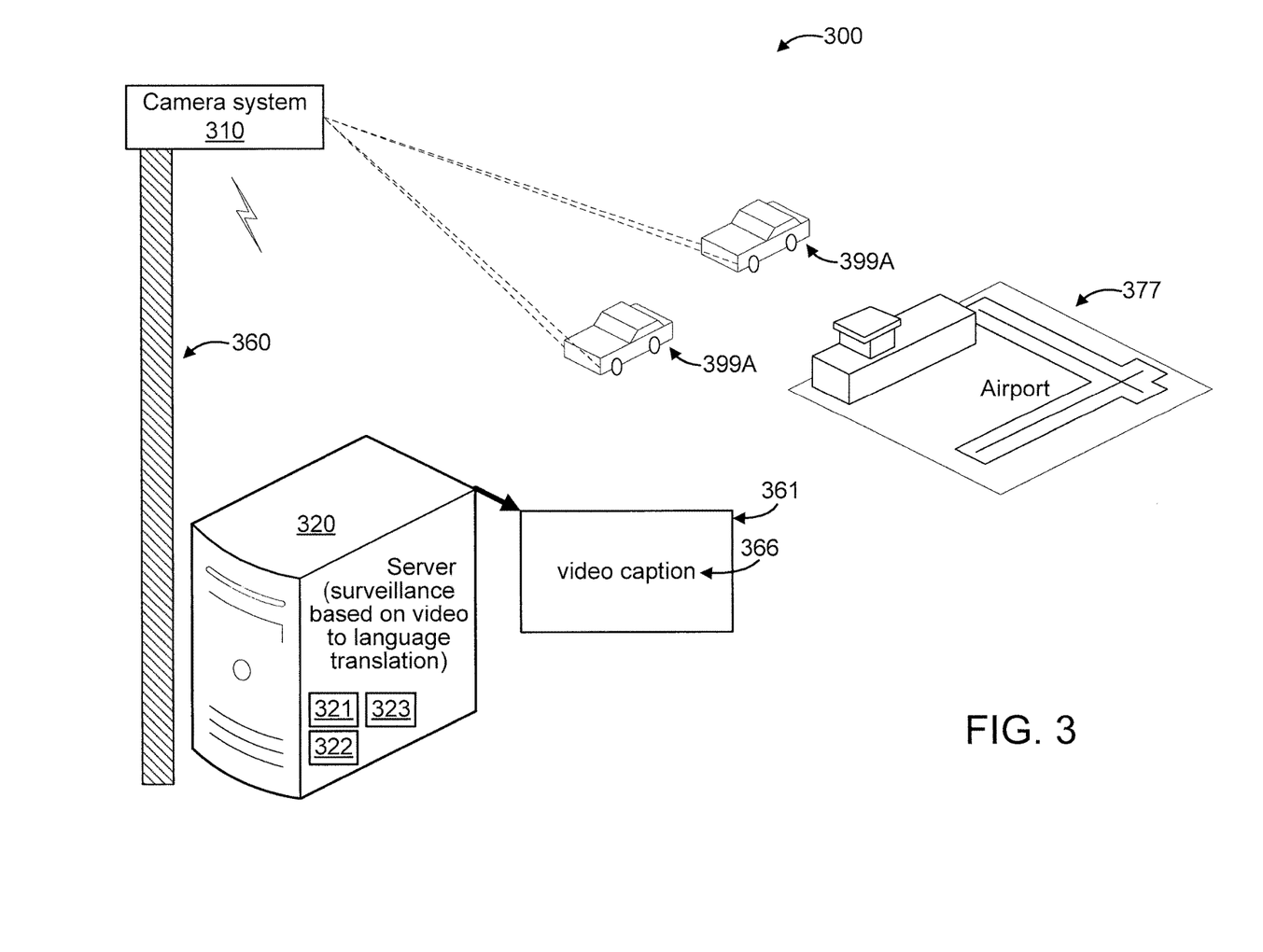
FIG. 3 shows an exemplary system for surveillance, in accordance with an embodiment of the present principles.

FIG. 3 shows an exemplary system 300 for surveillance based on tracking object detections, in accordance with an embodiment of the present principles.

The system 300 includes a camera system 310. While a single camera system 310 is shown in FIG. 3 for the sakes of illustration and brevity, it is to be appreciated that multiple camera systems can be also used, while maintaining the spirit of the present invention. The camera system 310 is configured to captures a video sequence formed from a set of input video frames that can include one or more objects 399A In the embodiment of FIG. 3, the camera system 310 is mounted on a mounting entity 360. For the sake of illustration, the mounting entity 360 is a pole. While a pole 360 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 310 can be mounted in or on any of the following: a building; and so forth. The preceding examples are merely illustrative.

The camera system 310 can be a wireless camera system having its own antenna(s) or can use one or more antennas included on the pole 360 (or other mounting entity (e.g., building, drone, etc.) to which the camera system 310 is mounted or proximate).

The system 300 further includes a server 320 configured to perform surveillance. Such surveillance can be with respect to a secured object such as, for example, a secured facility 377. In the example of FIG. 3, the secured facility is an airport. Of course, other secured facilities can also be surveilled in accordance with the present invention. The surveillance can involve translating a video to language, performing a comparison of the language (text) to text describing objects of interest (e.g., expected items and/or other prohibited items including, but not limited to, weapons, food, and so forth), and performing one or more actions in response to a result of the comparison. As is evident to one of ordinary skill in the art, the objects of interest will depend upon the particular implementation. The server 320 can be located remote from, or proximate to, the camera system 310. The server 320 can include a processor 321, a memory 322, and a wireless transceiver 323. The processor 321 and the memory 322 of the remote server 320 can be configured to perform surveillance based on images received from the camera system 310 by the (the wireless transceiver 323 of) the remote server 320. Comparison results can be used for a myriad of possible surveillance applications. Such applications can involve one or more actions performed responsive to the results of the comparison, as readily appreciated by one of ordinary skill in the art. For example, an alert (local and/or remote) can be provided, one or more doors and/or windows can be closed and locked to secure the person within a specific area or to keep the person from (out of) that specific area, a person containment procedure can be automatically performed, and so forth.

Accordingly, some exemplary suitable environments to which the present invention can be applied can include any environments where surveillance can prove useful such as mass transit hubs, border crossings, subways, transportation hubs, airports, ship ports, and so forth. It is to be appreciated that the preceding environments are merely illustrative and, thus, other environments can also be used, while maintaining the spirit of the present invention.

Figure 4:
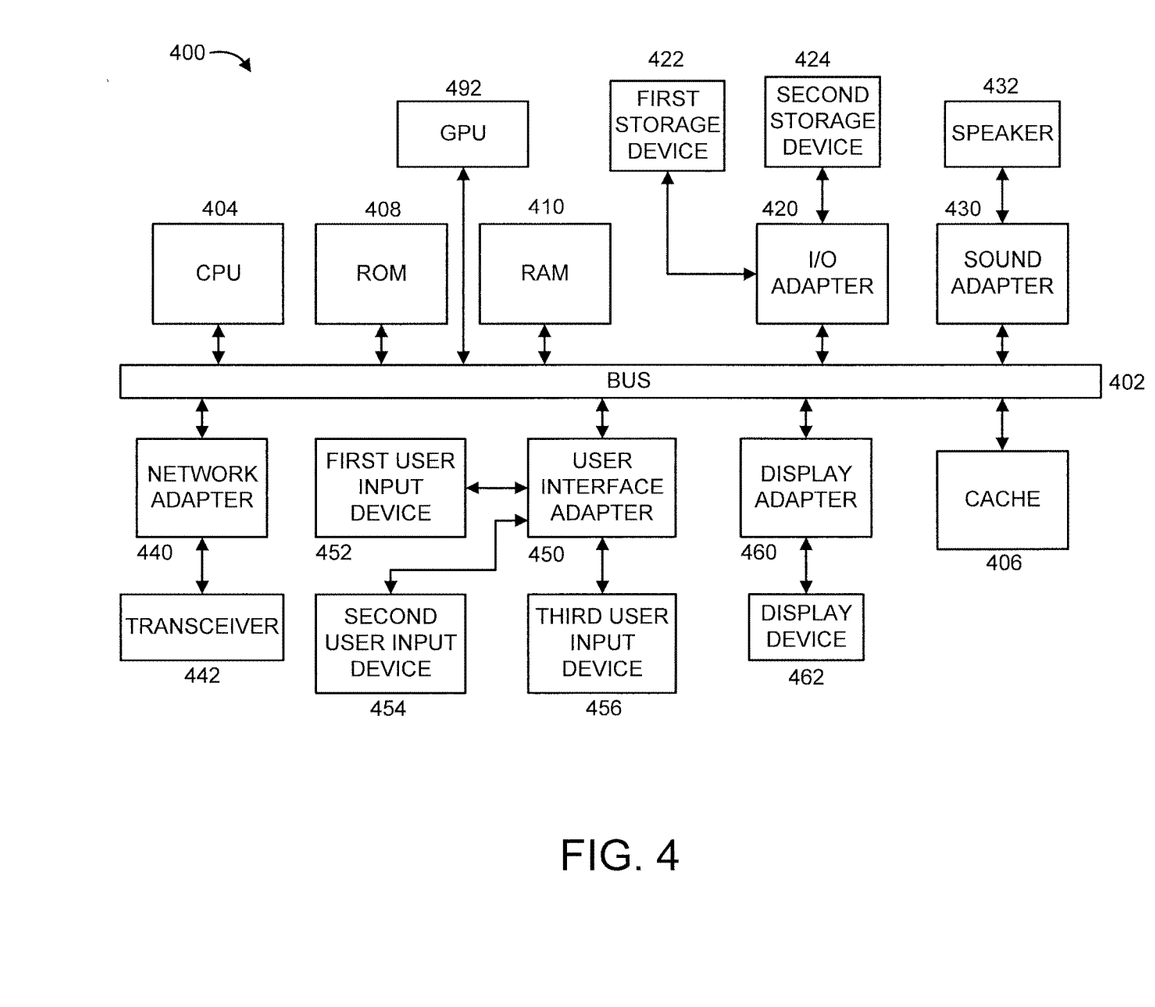
FIG. 4 shows an exemplary processing system to which the present principles may be applied, according to an embodiment of the present principles.

FIG. 4 shows an exemplary processing system 400 to which the present principles may be applied, according to an embodiment of the present principles. In an embodiment, the server 120 of FIG. 1 and/or the servers 270 of FIG. 2 and/or the server 320 of FIG. 3 can be implemented, at least in part, by processing system 400.

The processing system 400 includes at least one Central Processing Unit (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402. At least one Graphics Processing Unit (GPU) 192 is operatively coupled to the system bus.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that systems 100, 200, and 300, described above with respect to FIGS. 1, 2, and 3, respectively, are systems for implementing respective embodiments of the present principles. Part or all of processing system 400 may be implemented in one or more of the elements of any of systems 100, 200, and 300.

Further, it is to be appreciated that system 400 may perform at least part of the method described herein including, for example, at least part of method 500 of FIGS. 5-8. Similarly, part or all of any of systems 100, 200, and/or 300 may be used to perform at least part of method 500 of FIGS. 5-8.

FIGS. 5-8 show an exemplary method 500 for translating video to language, in accordance with an embodiment of the present principles.

Figure 5:
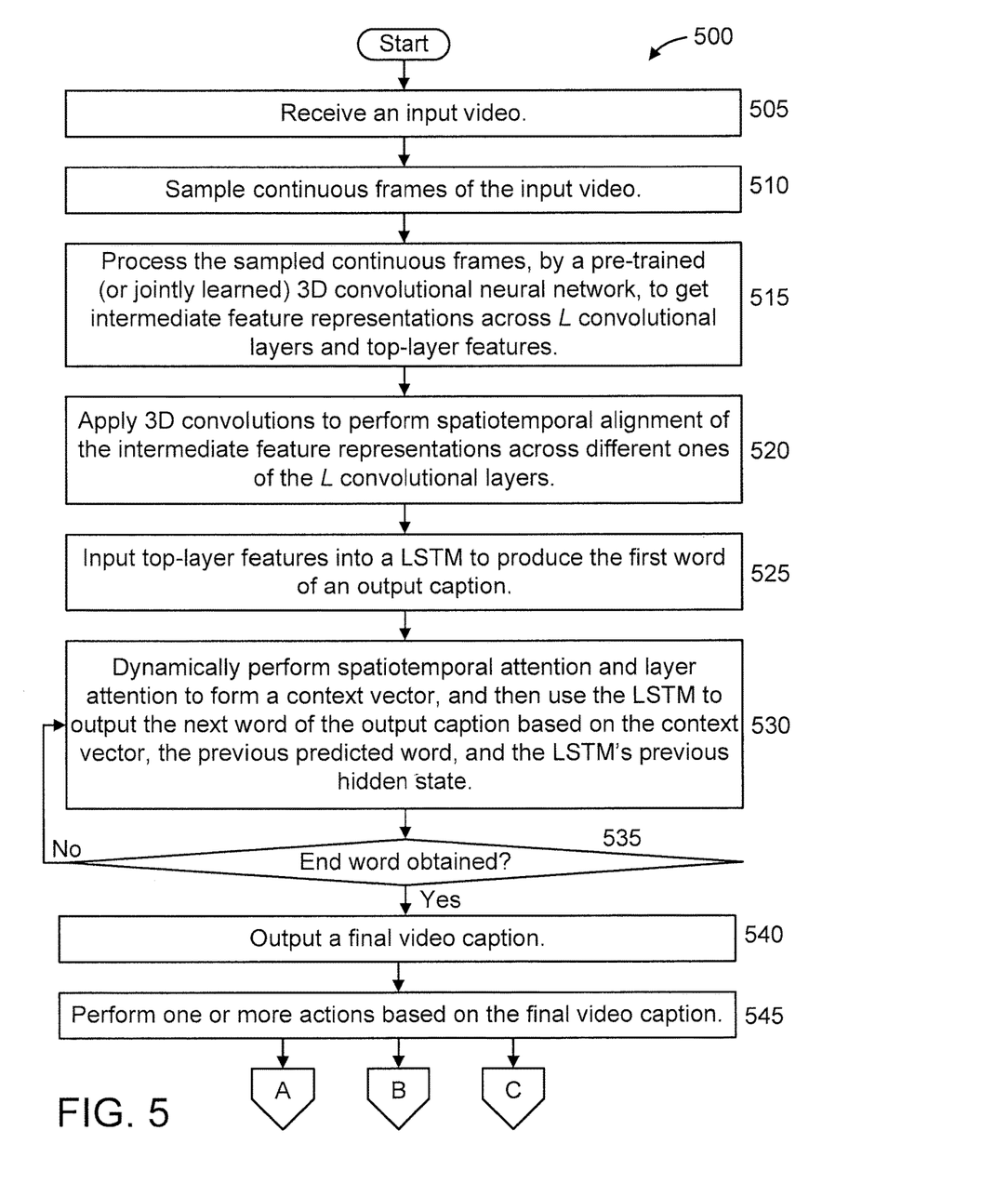
FIGS. 5-8 show an exemplary method for translating video to language, in accordance with an embodiment of the present principles.

Referring to FIG. 5, at step 505, receive an input video.

At step 510, sample continuous frames of the input video.

At step 515, process the sampled continuous frames, by a pre-trained (or jointly learned) 3D convolutional neural network, to get intermediate feature representations across L convolutional layers and top-layer features.

At step 520, apply 3D convolutions to perform spatiotemporal alignment of the intermediate feature representations across different ones of the L convolutional layers.

At step 525, input top-layer features into a LSTM to produce the first word of an output caption.

At step 530, dynamically perform spatiotemporal attention and layer attention to form a context vector, and then use the LSTM to output the next word of the output caption based on the context vector, the previous predicted word, and the LSTM's previous hidden state.

At step 535, determine whether an end word of a sentence has been obtained. If so, then proceed to step 540. Otherwise, return to step 530.

At step 540, output (e.g., display, and/or store, and/or so forth) a final video caption.

At step 545, perform one or more actions based on the final video caption. For example, the one or more actions can be based on a comparison performed between the final video caption and other text. The other text can correspond to applications including, but not limited to video captioning, video retrieval, video indexing, video analysis, action (occurring in the video) analysis, surveillance, and so forth. Hence, the one or more actions can be directed to one or more of the following: video captioning; video retrieval; video indexing, video analysis; action (occurring in the video) analysis; computer vision; surveillance; and so forth.

In an embodiment, step 545 can include one or more of steps 545A through 545C.

Figure 6:
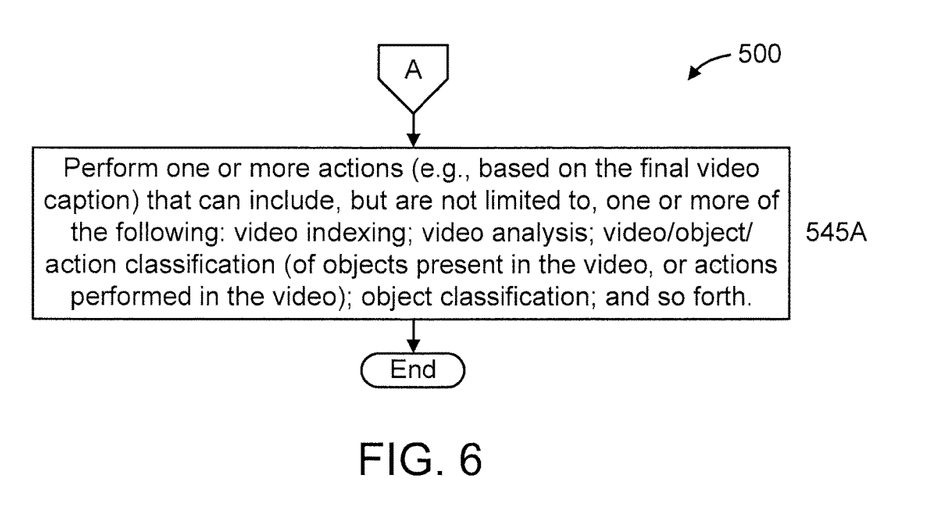

Referring to FIG. 6, at step 545A, corresponding to translating video to language, perform one or more actions (e.g., based on the final video caption) that can include, but are not limited to, one or more of the following: video indexing; video analysis; video/object/action classification (of objects present in the video, or actions performed in the video); object classification; and so forth.

Figure 7:
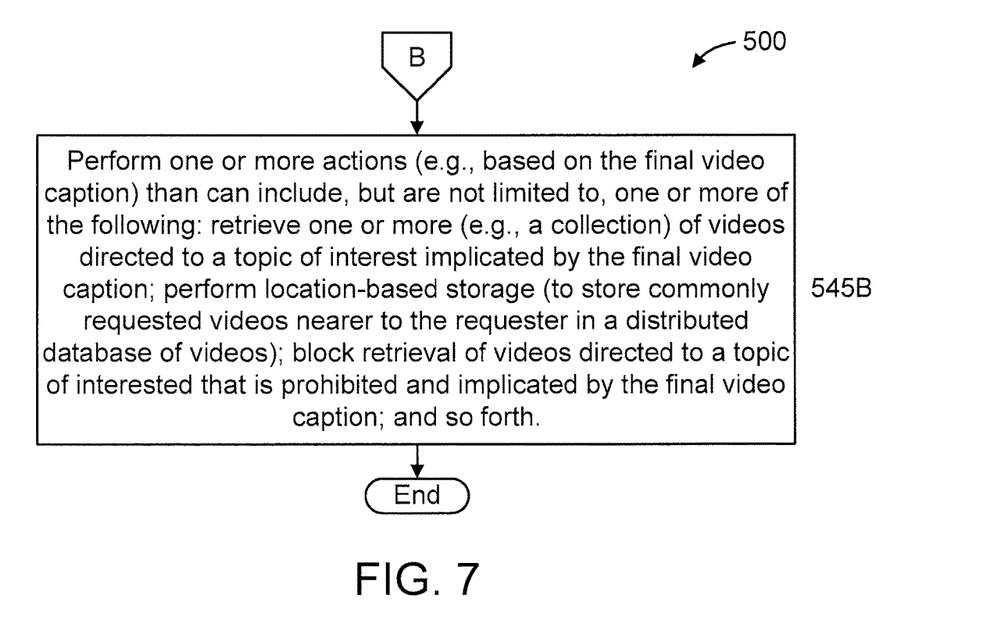

Referring to FIG. 7, at step 545B, corresponding to video retrieval, perform one or more actions (e.g., based on the final video caption) than can include, but are not limited to, one or more of the following: retrieve one or more (e.g., a collection) of videos directed to a topic of interest implicated by the final video caption; perform location-based storage (to store commonly requested videos nearer to the requester in a distributed database of videos); block retrieval of videos directed to a topic of interested that is prohibited and implicated by the final video caption; and so forth.

Figure 8:
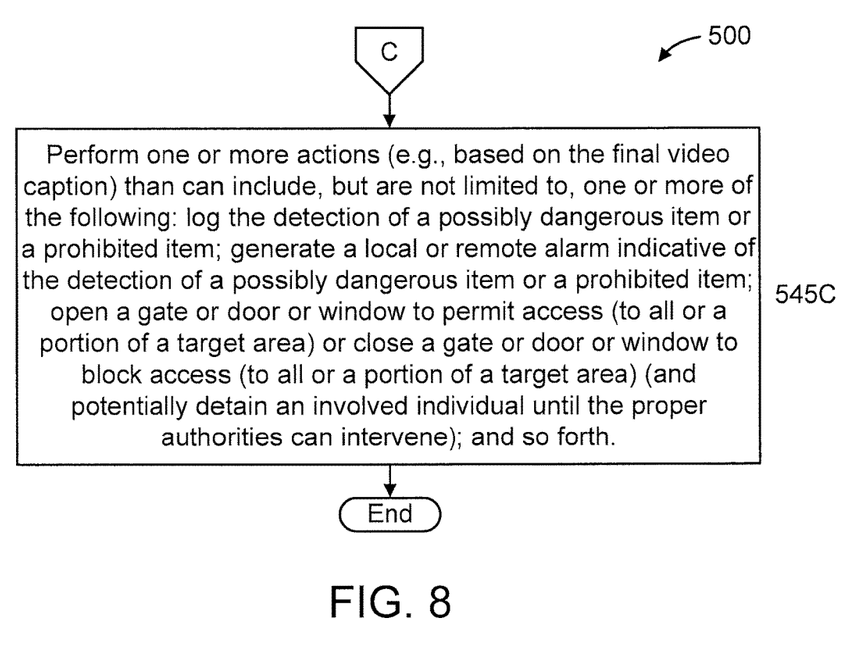

Referring to FIG. 8, at step 545C, corresponding to surveillance, perform one or more actions (e.g., based on the final video caption) than can include, but are not limited to, one or more of the following: log the detection of a possibly dangerous item or a prohibited item; generate a local or remote alarm indicative of the detection of a possibly dangerous item or a prohibited item; open a gate or door or window to permit access (to all or a portion of a target area) or close a gate or door or window to block access (to all or a portion of a target area) (and potentially detain an involved individual until the proper authorities can intervene); and so forth.

Regarding step 545 and its "sub-steps", the preceding actions mentioned with respect thereto are merely illustrative and, thus, other actions can also be performed in response to the final video caption. As is evident to one of ordinary skill in the art, the action(s) taken is(are) dependent upon the type of application to which the present invention is applied.

A description will now be given regarding further aspects of the present invention, in accordance with one or more embodiments of the present invention.

In an embodiment, the present invention provides a new model for video captioning, using a deep three-dimensional Convolutional Neural Network (C3D) as an encoder for videos and a recurrent neural network (RNN) as a decoder for the captions. Two distinct attentions are employed to adaptively and sequentially focus on different levels of feature abstractions as well as local spatiotemporal regions of the feature maps at each layer.

In an embodiment, a proposed decoding process for generating a sequence of words dynamically emphasizes different levels (CNN layers) of 3D convolutional features, to model important coarse or fine-grained spatiotemporal structure. Additionally, the model adaptively attends to different locations within the feature maps at particular layers. While some previous models use 2D CNN features to generate video representations, our model adopts features from a deep 3D convolutional neural network (C3D). Such features have been shown to be effective for video representations, action recognition and scene understanding, by learning the spatiotemporal features that can provide better appearance and motion information. In addition, in an embodiment, the functionality of adaptive spatiotemporal feature representation with dynamic abstraction in our model is implemented by two interpretable attention mechanisms, involving comparing and evaluating different levels of 3D convolutional feature maps. A challenge with this approach is that the features from different C3D levels have distinct dimensions. For example, low-level features provide fine resolution on localized spatiotemporal regions, while high-level features capture extended spatiotemporal space with less resolution. To enable direct comparisons between layers, we employ convolution operations to map different levels of features to the same semantic-space dimension, to enhance the decoding process.

In an embodiment, a video caption generation model is proposed, based on two distinct means of imposing attention. The attention is employed to adaptively and sequentially emphasize different levels of feature abstraction (CNN layers), while also imposing attention within local regions of the feature maps at each layer. The proposed model is interchangeably referred to herein as "Adaptive SpatioTemporal with dynAmic abstRaction" (ASTAR).

A further description will now be given of method 300, in accordance with an embodiment of the present invention.

Consider N training videos, the nth of which is denoted $X^{(n)}$, with associated caption $Y^{(n)}$. The length-$T_n$ caption is represented $Y^{(n)} = (y_1^{(n)}, \ldots, y_{T_n}^{(n)})$, with $y_t^{(n)}$ a 1-of-V ("one hot") encoding vector, with V the size of the vocabulary.

For each video, the C3D feature extractor produces a set of features $A^{(n)} = \{a_1^{(n)}, \ldots, a_L^{(n)}, a_{L+1}^{(n)}\}$, where $\{a_1^{(n)}, \ldots, a_L^{(n)}\}$ are feature maps extracted from L convolutional layers, and $a_{L+1}^{(n)}$ is obtained from the top fully-connected layer.

The convolutional layer features used in the captioning model, $\{a_1^{(n)}, \ldots, a_L^{(n)}\}$, are extracted by feeding the entire video into C3D at once, and hence the dimensions of $\{a_1^{(n)}, \ldots, a_L^{(n)}\}$ is dependent on the video length. We will employ a spatiotemporal attention at each layer (and between layers), and therefore it is not required that the sizes of $\{a_1^{(n)}, \ldots, a_L^{(n)}\}$ be the same for all videos. Note that C3D is trained on video clips with 16 frames, which requires the video length for extracting features from the top fully-connected layer to be 16. To generate $a_{L+1}^{(n)}$, we employ mean pooling of the convolutional-layer features, based on a window of length 16 with an overlap of 8 frames.

A description will now be given regarding the caption model, in accordance with an embodiment of the present invention.

Figure 9:
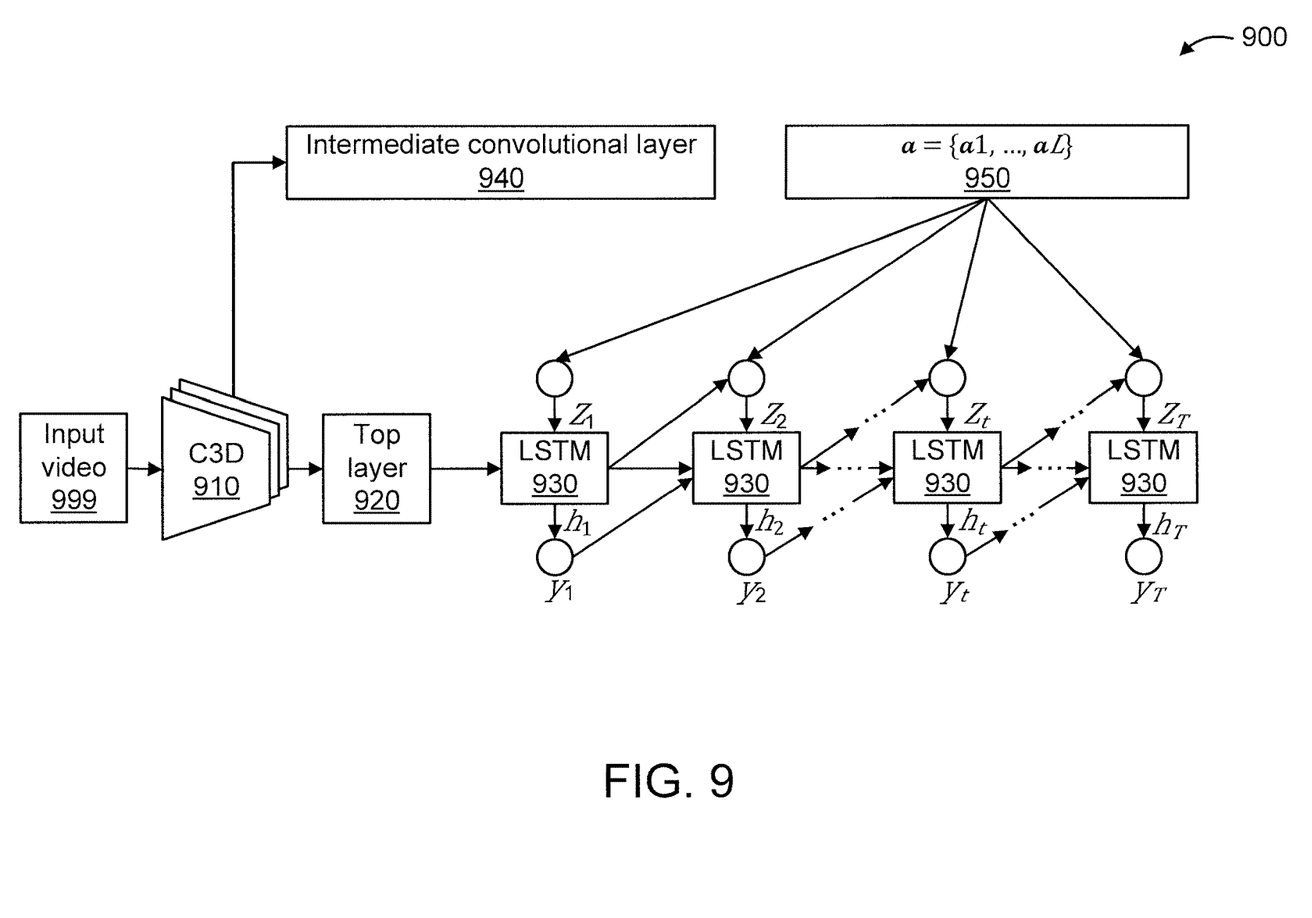
FIG. 9 shows an exemplary caption generation model, in accordance with an embodiment of the present invention.

FIG. 9 shows an exemplary caption generation model 900, in accordance with an embodiment of the present invention.

In the following, we omit superscript n, for notational simplicity. The t-th word in a caption, $y_t$, is embedded into an M-dimensional real vector $w_t = W_e y_t$, where $W_e \in \mathbb{R}^{M \times V}$ is a word embedding matrix (to be learned), i.e., $w_t$ is a column of $W_e$ $\mathbb{R}$ chosen by the one-hot $y_t$. The probability of the whole caption $Y = \{y_t\}_{t=1}$, T is defined as follows:

$$p(Y|A) = p(y_1|A) \Pi_{t=2}^T p(y_t | y_{<t}, A) \qquad (1)$$

Specifically, we first generate the beginning word $y_1$, with $p(y_1) = \text{softmax}(Vh_1)$, where $h_1 = \tan h(Ca_{L+1})$. Bias terms are omitted for simplicity throughout the paper. All the other words in the caption are then sequentially generated using a recurrent neural network (RNN), until the end sentence symbol is generated. Each conditional $p(y_t|y_{<t})$ is specified as softmax($Vh_t$), where $h_t$ is recursively updated through $h_t = \mathcal{H}(w_{t-1}, h_{t-1}, z_t)$. V is the weight matrix connecting the RNN's hidden state, used for computing a distribution over words. $z_t = \phi(h_{t-1}, a_1, \ldots, a_L)$ is the context vector used in the attention mechanism, capturing the relevant visual feature associated with an associated spatiotemporal attention, as described herein below.

Note that the top fully-connected-layer feature $a_{L+1}$ is only used to generate the first word (encapsulating overall-video features). We found that only using $a_{L+1}$ there works better in practice than using it at each time step of the RNN.

The transition function $\mathcal{H}(\bullet)$ is implemented with a Long Short-Term Memory (LSTM). At time t, the LSTM unit consists of a memory cell $c_t$ and three gates, i.e., input gate $i_t$, forget gate $f_t$, and output gate $o_t$. The memory cell transmits the information from the previous step to the current step, while the gates control reading or writing the memory unit through sigmoid functions. Specifically, the hidden units $h_t$ are updated as follows:

$$i_t = \sigma(W_{iw} w_{t-1} + W_{ih} h_{t-1} + W_{iz} z_t), f_t = \sigma(W_{fw} w_{t-1} + W_{fh} h_{t-1} + W_{fz} z_t), o_t = \sigma(W_{ow} w_{t-1} + W_{oh} h_{t-1} + W_{oz} z_t), \tilde{c}_t = \tan h(W_{cw} w_{t-1} + W_{ch} h_{t-1} + W_{cz} z_t) \ c_t = f_t \odot c_{t-1} + i_t \odot \tilde{c}_t,$$
$$h_t = o_t \odot \tan h(c_t), \qquad (2)$$

where $\sigma(\bullet)$ and $\odot$ denotes the logistic sigmoid function and the element-wise multiply operator, respectively. Matrices $W_{\{i,f,o,c\}}$, V and C represent the set of LSTM parameters that will be learned (plus associated biases).

Given the video X (with features A) and associated caption Y, the objective function is the sum of the log-likelihood of the caption conditioned on the video representation:

$$\log p(Y|A) = \log p(y_1|A) + \Sigma_{t=2}^T \log p(y_t|y_{<t}, A) \quad (3)$$

The above objective corresponds to a single video-caption pair, and when training we sum over all such training pairs.

The model 900 includes a 3D pre-trained convolutional neural network (C3D) 910, a top layer 920, a set of LSTMs 930, an intermediate convolutional layer 940, and convolutional maps 950.

Input video 999 is provided to C3D 910. The model 900 leverages the fully-connected map from the top layer 920 as well as convolutional maps 950 from different mid-level layers of the C3D 910, as described herein.

A description will now be given of an attention mechanism, in accordance with an embodiment of the present invention.

Figure 10:
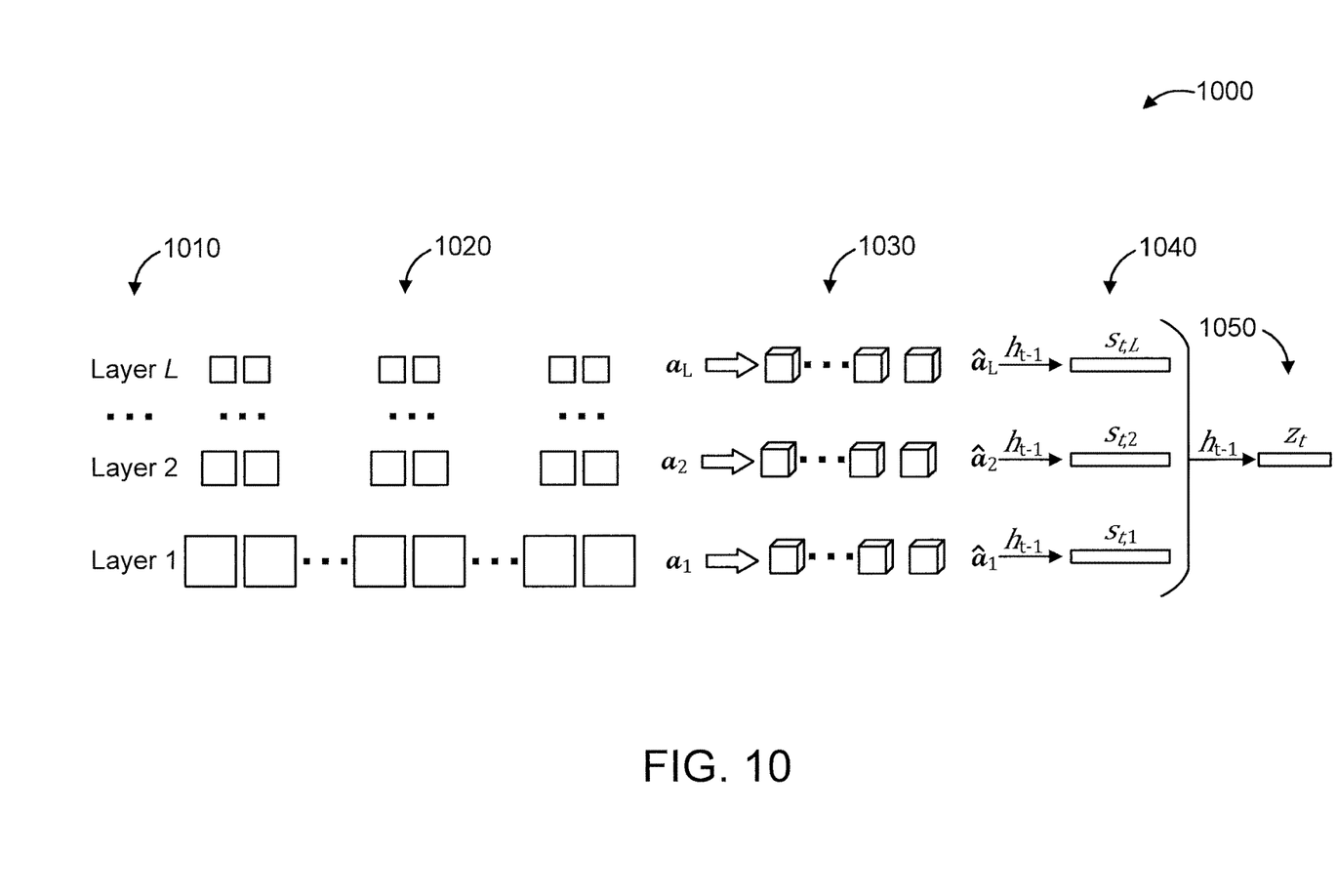
FIG. 10 shows an attention mechanism, in accordance with an embodiment of the present invention.

FIG. 10 shows an attention mechanism 1000, in accordance with an embodiment of the present invention.

The attention mechanism involves layers 1 through L (collectively denoted by figure reference numeral 1010), feature extraction 1020, convolutional transformation 1030, spatial-temporal attention 1040, and abstraction attention 1050.

The attention mechanism $\phi(h_{t-1}, a_1, \ldots, a_L)$ at time step t is now developed. Let $a_{i,l} \in \mathbb{R}^{n_k^l}$ correspond to the feature vector extracted from the l-th layer at location i, where $i \in [1, \ldots, n_f^l] \times [1, \ldots, n_x^l] \times [1, \ldots, n_y^l]$ indicates a certain cuboid in the input video, and $n_k^l$ is the number of convolutional filters in the l-th layer of C3D. For each feature vector $a_{i,l}$, the attention mechanism 1000 generates two positive weights at time t, with $\alpha_{ti} = f_{att}(a_i, h_{t-1})$ and $\beta_{tl} = f_{att}(a_l, h_{t-1})$, which measure the relative importance to location i and layer l for producing the next word based on the history word information, respectively.

The most straightforward way to generate the attention weights is to employ a multi-layer perceptron (MLP). However, this approach cannot be directly applied to $a_{i,l}$ for three reasons: (i) the dimensions of al vary across layers; (ii) the features represented in each layer by al are not spatiotemporally aligned (i.e., there is no correspondence between i across layers); and (iii) the semantic meaning of the convolutional filters in each layer can be different (hence, the features are in different semantic spaces).

To address these issues, we apply a convolutional transformation 1030 to embed each $a_{i,l}$ into the same semantic space, defined as follows:

$$\hat{a}_l = \sum_{k=1}^{n_k^l} f(a_l * U_k^l) \quad (4)$$

where $l=1, \ldots, L-1$, and $\hat{a}_L = a_L$; symbol * represents the 3-dimensional convolution operator, and $f(\bullet)$ is an element-wise nonlinear activation function with pooling. $U_k^l$ of size $O_f^l \times O_x^l \times O_y^l \times n_k^L$ is the learned semantic embedding parameters. In addition, $O_f^l$, $O_x^l$ and $O_y^l$ are chosen such that each $\hat{a}_l$ (for all l) will have the same dimensions of $n_k^L \times n_f^L \times n_x^L \times n_y^L$ and induce spatiotemporal alignment across features from different layers (indexed by $i \in [1, \ldots, n_f^L] \times [1, \ldots, n_x^L] \times [1, \ldots, n_y^L]$).

The attention weights $\alpha_{ti}$ and $\beta_{tl}$ and context vector $z_t$ are computed by the following:

$$e_{ti} = w_\alpha^T \tan h(W_{\alpha\alpha}\hat{a}_i + W_{h\alpha}h_{t-1}), \alpha_{ti} = \text{softmax}(e_{ti}),$$
$$s_t = \psi(\{\hat{a}_i\}, \{\alpha_{ti}\}), \quad (5)$$

$$b_{tl} = w_\beta^T \tan h(W_{s\beta}s_{tl} + W_{h\beta}h_{t-1}), \beta_{tl} = \text{softmax}(b_{tl}), z_t = \psi(\{s_{tl}\}, \{\beta_{tl}\}), \quad (6)$$

where $\psi(\bullet)$ is a function that returns a single feature vector when given a set of feature vectors, and their corresponding weights across all i or l. $\hat{a}_i$ is a vector of spatio-temporally aligned features composed by stacking $\{\hat{a}_i; 1\}_{l=1, \ldots, L}$.

To make the following discussion concrete, we describe the attention function within the context of $z_t = \psi(\{s_{tl}\}, \{\beta_{tl}\})$. This function setup is applied in the same way $s_t = \psi(\{\hat{a}_i\}, \{\alpha_{ti}\})$.

Soft attention: We formulate the soft attention model by computing a weighted sum of the input features as follows:

$$z_t = \psi(\{s_{tl}\}, \{\beta_{tl}\}) = \Sigma_{l=1}^L \beta_{tl} s_{tl} \quad (7)$$

The model is differentiable for all parameters and can be learned end-to-end using standard back propagation.

Hard attention: Let $m_t \in \{0,1\}^L$ be a vector of all zeros, and a single one, and the location of the non-zero element of $m_t$ identifies the location to extract features for generating the next word. We impose the following:

$$m_t \sim \text{Mult}(1, \{\beta_{tl}\}), z_t = \Sigma_{l=1}^L m_{tl} s_{tl} \quad (8)$$

In this case, optimizing the objective function in Equation (3) is intractable. However, the marginal log likelihood can be lower-bounded as follows:

$$\log p(Y|A) = \log \Sigma_m p(m|A)p(Y|m,A) \geq \Sigma_m p(m|A) \log p(Y|m,A) \quad (9)$$

where $=\{m_t\}_{t=1, \ldots, T}$. Inspired by importance sampling, the multi-sample stochastic lower bound has been recently used for latent variable models, defined as follows:

$$\mathcal{L}^K(Y) = \sum_{m^{1:K}} p(m^{1:K}|A) \left[ \log \frac{1}{K} \sum_{k=1}^K p(Y|m^k, A) \right] \quad (10)$$

where $m_1, \ldots, m_K$ are independent samples. This lower bound is guaranteed to be tighter with the increase of the number of samples K, thus providing a better approximation of the objective function than Equation (9). The gradient of $\mathcal{L}^K(Y)$ with respect to the model parameters is as follows:

$$\nabla \mathcal{L}^K(Y) = \Sigma_{m^{1:K}} p(m^{1:K}|A) \Sigma_{k=1}^K [L(m^{1:K}) \nabla \log p(m^k|A) + \omega_k \nabla p(Y|m^k, A)] \quad (11)$$

where $$L(m^{1:K}) = \log \frac{1}{K} \sum_{k=1}^K p(Y|m^k, A) \text{ and } \omega_k = \frac{p(Y|m^k, A)}{\sum_j p(Y|m^j, A)}.$$

A variance reduction technique replaces the above gradient with an unbiased estimator as follows:

$$\nabla \mathcal{L}^K(Y) \approx p(m^{1:K}|A) \Sigma_{k=1}^K [\hat{L}(m^k|m^{-k}) \nabla \log p(m^k|A) + \omega_k \nabla p(Y|m^k, A)] \quad (12)$$

where $$\hat{L}(m^k|m^{-k}) = L(m^{1:K}) - \log \frac{1}{K} \left( \sum_{j \neq k} p(Y|m^j, A) + f(Y, m^{-k}, A) \right) \quad (13)$$

-continued $$f(Y, m^{-k}, A) = \exp\left(\frac{1}{K-1}\sum_{j\neq k} \log p(Y \mid m^j, A)\right) \quad (14)$$

When learning the model parameters, the lower bound (10) is optimized via the gradient approximation in Equation (12).

An alternative method is first producing abstraction level attention weights $\beta_l$ and then producing spatiotemporal attention weights $\alpha_i$, i.e., switching the order of Equation (5) and Equation (6).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for video captioning, comprising:
   a processor configured to
      apply a three-dimensional Convolutional Neural Network (C3D) to image frames of a video sequence to obtain, for the video sequence, (i) intermediate feature representations across L convolutional layers and (ii) top-layer features,
      produce a first word of an output caption for the video sequence by applying the top-layer features to a Long Short Term Memory (LSTM),
      produce subsequent words of the output caption by (i) dynamically performing spatiotemporal attention and layer attention using the intermediate feature representations to form a context vector, and (ii) applying the LSTM to the context vector, a previous word of the output caption, and a hidden state of the LSTM; and
   a display device for displaying the output caption to a user,
      wherein the spatiotemporal attention and layer attention adaptively and sequentially emphasize different ones of the L convolutional layers while imposing attention within local regions of feature maps at each of the L convolutional layers in order to form the context vector.

2. The system of claim 1, wherein the top-layer features are obtained from a top-fully connected layer of the C3D.

3. The system of claim 1, wherein the intermediate feature representations are obtained as feature maps.

4. The system of claim 1, wherein the processor is further configured to spatio-temporally align the intermediate feature representations across different ones of the L convolutional layers, by applying, using the C3D, three-dimensional (3D) convolutions to the intermediate feature representations.

5. The system of claim 1, wherein the processor produces the first word of the output caption using the top-layer features while bypassing the intermediate feature representations.

6. The system of claim 1, wherein the processor is further configured to determine a status of a word as being a final word in the output caption based on a detection of a symbol indicative of the word being an end word.

7. The system of claim 1, wherein each of the intermediate feature representations is extracted at a respective location in a respective one of the L convolutional layers, and wherein the spatiotemporal attention and layer attention generates, for each of the intermediate feature representations, two positive weight vectors for a particular time step that respectively measure a relative importance, to the respective location and to the respective one of the L convolutional layers, for producing the subsequent words based on history word information.

8. The system of claim 1, wherein the spatiotemporal attention and layer attention selectively uses an attention type selected from the group consisting of a soft attention and a hard attention, wherein the hard attention is configured to use a multi-sample stochastic lower bound to approximate an objective function to be optimized.

9. The system of claim 1, wherein the spatiotemporal attention and layer attention involve direct comparisons between different ones of the L convolutional layers to produce the context vector, the direct comparisons enabled by applying a set of convolutional transformations to map different ones of the intermediate feature representations in different ones of the L convolutional layers to a same semantic-space dimension.

10. The system of claim 1, wherein the processor is further configured to train the C3D using an objective function that sums over respective log-likelihoods of proposed caption words that are conditioned on a set of training video sequences.

11. The system of claim 1, further comprising an image capture device configured to capture the video sequence.

12. A computer-implemented method for video captioning, comprising:
   applying, by a processor, a three-dimensional Convolutional Neural Network (C3D) to image frames of a video sequence to obtain, for the video sequence, (i) intermediate feature representations across L convolutional layers and (ii) top-layer features;
   producing, by the processor, a first word of an output caption for the video sequence by applying the top-layer features to a Long Short Term Memory (LSTM);
   producing, by the processor, subsequent words of the output caption by (i) dynamically performing spatiotemporal attention and layer attention using the intermediate feature representations to form a context vector, and (ii) applying the LSTM to the context vector, a previous word of the output caption, and a hidden state of the LSTM; and
   displaying, by a display device, the output caption to a user,
   wherein the spatiotemporal attention and layer attention adaptively and sequentially emphasize different ones of the L convolutional layers while imposing attention within local regions of feature maps at each of the L convolutional layers in order to form the context vector.

13. The computer-implemented method of claim 12, wherein the top-layer features are obtained from a top-fully connected layer of the C3D.

14. The computer-implemented method of claim 12, wherein the method further comprises spatio-temporally aligning the intermediate feature representations across different ones of the L convolutional layers, by applying, using the C3D, three-dimensional (3D) convolutions to the intermediate feature representations.

15. The computer-implemented method of claim 12, wherein the first word of the output caption is produced using the top-layer features while bypassing the intermediate feature representations.

16. The computer-implemented method of claim 12, wherein each of the intermediate feature representations is extracted at a respective location in a respective one of the L convolutional layers, and wherein the spatiotemporal attention and layer attention generates, for each of the intermediate feature representations, two positive weights for a particular time step that respectively measure a relative importance, to the respective location and to the respective one of the L convolutional layers, for producing the subsequent words based on history word information.

17. The computer-implemented method of claim 12, wherein the spatiotemporal attention and layer attention involve direct comparisons between different ones of the L convolutional layers to produce the context vector, the direct comparisons enabled by applying a set of convolutional transformations to map different ones of the intermediate feature representations in different ones of the L convolutional layers to a same semantic-space dimension.

18. A computer program product for video captioning, the computer program product comprising a non-transitory computer readable storage medium having program instructions embodied therewith, the program instructions executable by a computer to cause the computer to perform a method comprising:
   applying, by a processor of the computer, a three-dimensional Convolutional Neural Network (C3D) to image frames of a video sequence to obtain, for the video sequence, (i) intermediate feature representations across L convolutional layers and (ii) top-layer features;
   producing, by the processor, a first word of an output caption for the video sequence by applying the top-layer features to a Long Short Term Memory (LSTM);
   producing, by the processor, subsequent words of the output caption by (i) dynamically performing spatiotemporal attention and layer attention using the intermediate feature representations to form a context vector, and (ii) applying the LSTM to the context vector, a previous word of the output caption, and a hidden state of the LSTM; and
   displaying, by a display device operatively coupled to the computer, the output caption to a user,
   wherein the spatiotemporal attention and layer attention adaptively and sequentially emphasize different ones of the L convolutional layers while imposing attention within local regions of feature maps at each of the L convolutional layers in order to form the context vector.

* * * * *